United States Patent [19]

Willinger

[11] Patent Number: 4,735,715
[45] Date of Patent: Apr. 5, 1988

[54] POWER UNIT FOR AQUARIUM FILTER ASSEMBLY

[75] Inventor: Allan H. Willinger, Oakland, N.J.

[73] Assignee: Willinger Bros., Inc., Oakland, N.J.

[21] Appl. No.: 910,121

[22] Filed: Sep. 22, 1986

[51] Int. Cl.[4] .............................................. A01K 63/04
[52] U.S. Cl. .................................. 210/169; 210/416.2;
       417/360; 417/373
[58] Field of Search ........................... 210/169, 416.2;
       417/313, 360, 423 R, 373; 285/42

[56] References Cited

U.S. PATENT DOCUMENTS

| | | | |
|---|---|---|---|
| 3,074,349 | 1/1963 | Zimmermann | 417/423 R |
| 3,512,646 | 7/1966 | Willinger | 210/169 |
| 4,285,813 | 8/1981 | Stewart et al. | 210/169 |
| 4,512,885 | 4/1985 | Willinger | 210/169 |
| 4,559,136 | 12/1985 | Dockery | 417/360 |
| 4,589,982 | 5/1986 | Willinger | 210/169 |
| 4,602,996 | 7/1986 | Willinger | 210/169 |
| 4,620,330 | 11/1986 | Izzi | 285/42 |

Primary Examiner—Peter Hruskoci
Assistant Examiner—Coreen Y. Lee
Attorney, Agent, or Firm—Helfgott & Karas

[57] ABSTRACT

An aquarium filter assembly having a filter box with an impeller unit. An encapsulated electromagnetic power unit is removably coupled to the filter box for driving the impeller unit. The power unit is thermally separated from the filter box to prevent damage to the filter box as a result of the heat generated by the power unit.

8 Claims, 2 Drawing Sheets

POWER UNIT FOR AQUARIUM FILTER ASSEMBLY

BACKGROUND OF THE INVENTION

This invention relates to aquarium filters, and more specifically to an external aquarium filter utilizing a pump impeller which is magnetically driven by a removable power unit.

Aquarium filters are utilized for aeration, circulation and filtration of the aquarium water. One type of aquarium filter is the externally mounted filter which houses filtration equipment and includes a pumping mechanism which induces the circulation of water from the aquarium tank through the filtration equipment and then returns the clean water to the aquarium. The pumping mechanism is generally provided within the water flow path. Some filters utilize a hermetically enclosed pump which is placed directly within the flow path. Others place an impeller in the flow path and magnetically couple the impeller to a driving unit.

An aquarium filter assembly of a type using a magnetically coupled impeller is described in U.S. Pat. No. 4,512,885 assigned to the assignee of the present invention. Such aquarium filter assembly includes a filter box which is adapted to be mounted on a wall of an aquarium tank and contains an inlet chamber for receiving contaminated water from the aquarium tank, and a filter chamber for filtering the contaminated water and directing the filtered water to flow back into the aquarium tank. A removable unitary assembly is supported on the filter box and includes an intake tube for insertion into the aquarium tank and a discharge tube positioned in the inlet chamber. A pump impeller unit depends from the end of the discharge tube. The impeller unit includes a rotor shaft on which is mounted a magnet. A stator unit is removably coupled to the filter box so that it is magnetically coupled to the magnet on the rotor shaft, whereby it drives the rotor through a magnetic flux relationship.

Although the impeller unit is within the flow path of the water, the electromagnetic stator elements are fluidically sealed from the flow path. In the aforementioned U.S. Patent a tube depends from the filter box and the rotor shaft sits in the tube. The stator unit includes an aperture between the legs of the stator laminations for receiving the depending tube. In a variation of this filter assembly, the stator unit includes a fluidially sealed well formed between the legs of the stator laminations for directly receiving the impeller unit.

The stator unit is generally provided as a housing forming a separate power unit. The power unit is removably mounted onto the filter box. Typically, an aperture is provided in the inlet chamber of the filter box from which the magnet impeller assembly depends. The power unit includes a hollow cylindrical stem portion which locks into the aperture and defines the mouth of the well in the power unit into which the magnetic impeller assembly sits. An O-ring is situated around the cylindrical stem and fluidially seals the connection between the power unit and the aperture.

The power unit houses stator laminations with an electromagnetic coil winding. The coil is connected to a source of electricity and provides the necessary magnetic flux flow path through the laminations for driving the magnetically coupled rotor. A potting compound surrounds the laminations and the coil for protecting these electromagnetic elements and preventing water from reaching them.

During normal operation, the water drawn in by the impeller will fill the inlet chamber of the filter box and the well in which the magnetic impeller assembly sits. The flow of water around the magnetic impeller assembly provides adequate cooling of the heat generated by the power unit. During such normal operation, the flow of water is sufficient to keep the temperature reduced to avoid damage to the filter box.

When the filter stops through power failure and doesn't restart, or when the impeller gets blocked, the flow of water through the filter stops. The existing water in the filter tends to evaporate. Such evaporation more easily takes place adjacent the power unit because of the heat generated by this unit. With the water evaporated from the well, there is insufficient cooling of the power unit. The heat is coupled through the O-ring to the aperture of the filter box and has a tendency of causing slight deformation or melting around the aperture of the filter box. Such deformation or melting causes leaks at the aperture.

Even though the blockage is removed or the filter is restarted, the leaks continue around the aperture and the entire filter box must be replaced.

Accordingly, while such aquarium filter assemblies have been found to be exceedingly useful, on the occasion of the filter running dry, heating of the filter has caused leaks to the filter box.

SUMMARY OF THE INVENTION

It is accordingly an object of the present invention to provide an aquarium filter assembly which avoids the aforementioned problems of prior art devices.

Still another object of the present invention is to provide a power unit for an aquarium filter assembly which avoids detrimentally affecting the filter box of the filter assembly as a result of the thermal heat generated by the power unit.

Yet a further object of the present invention is to provide a power unit for magnetic coupling to a magnetic impeller assembly supported on a filter box where leaks at the juncture of the power unit and the filter box which would otherwise result from the heat produced in the power unit are avoided.

A further object of the present invention is to provide a power unit which is thermally isolated from a filter box to which the power unit is removably connected.

Yet another object of the present invention is to provide a motor stator unit which can be removably coupled to a filter box for magnetically driving an impeller supported on the filter box, and including a thermal protector arrangement for avoiding thermal damage to the filter box.

Briefly, in accordance with the present invention, there is provided an aquarium filter assembly including a filter box with an impeller unit supported on the filter box. An encapsulated electromagnetic power unit for driving the impeller unit is removably coupled to the filter box. The power unit is connected in thermal separation from the filter box.

In accordance with an aspect of the invention, the power unit is a form of a stator unit including a housing with a stator assembly in the housing. A coupling device associated with the stator unit removably couples the unit to the aquarium filter box in magnetic flux relationship with the impeller unit. Thermal isolating means isolate the housing of the stator unit from the aquarium filter box to prevent thermal damage to the filter box.

The thermal isolation is achieved with two features. Firstly, a collar is used to space the power unit housing from the filter box to permit a flow of air between the housing and the filter box. Secondly, a thin walled material is used at the collar to prevent heat build up at the aperture of the filter box.

In an embodiment of the invention, the stator unit housing contains potting material which surrounds the electromagnetic elements in the housing unit. The potting material is encapsulated with a plastic outer shell. Integrally formed with the plastic shell is a hollow thin walled cylindrical stem which does not contain the potting material. An O-ring is spaced along the stem leaving beneath it a collar of plastic material separating the O-ring from the housing containing the potting material. The stem is inserted into an aperture in the filter box and the O-ring seals the connection between the stem and the aperture. The collar spaces the housing from the filter box and thermally isolates the potting material, which tends to heat up, and prevents the heat from directly contacting the filter box. This prevents the distortion or melting at the peripheral edge of the aperture in the filter box.

These and other objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings:

FIG. 6 is an exploded view of section A shown in FIG. 4

In the various figures of the drawing like reference characters designate like parts.

DESCRIPTION OF THE PREFERRED EMBODIMENT

Figure 1:
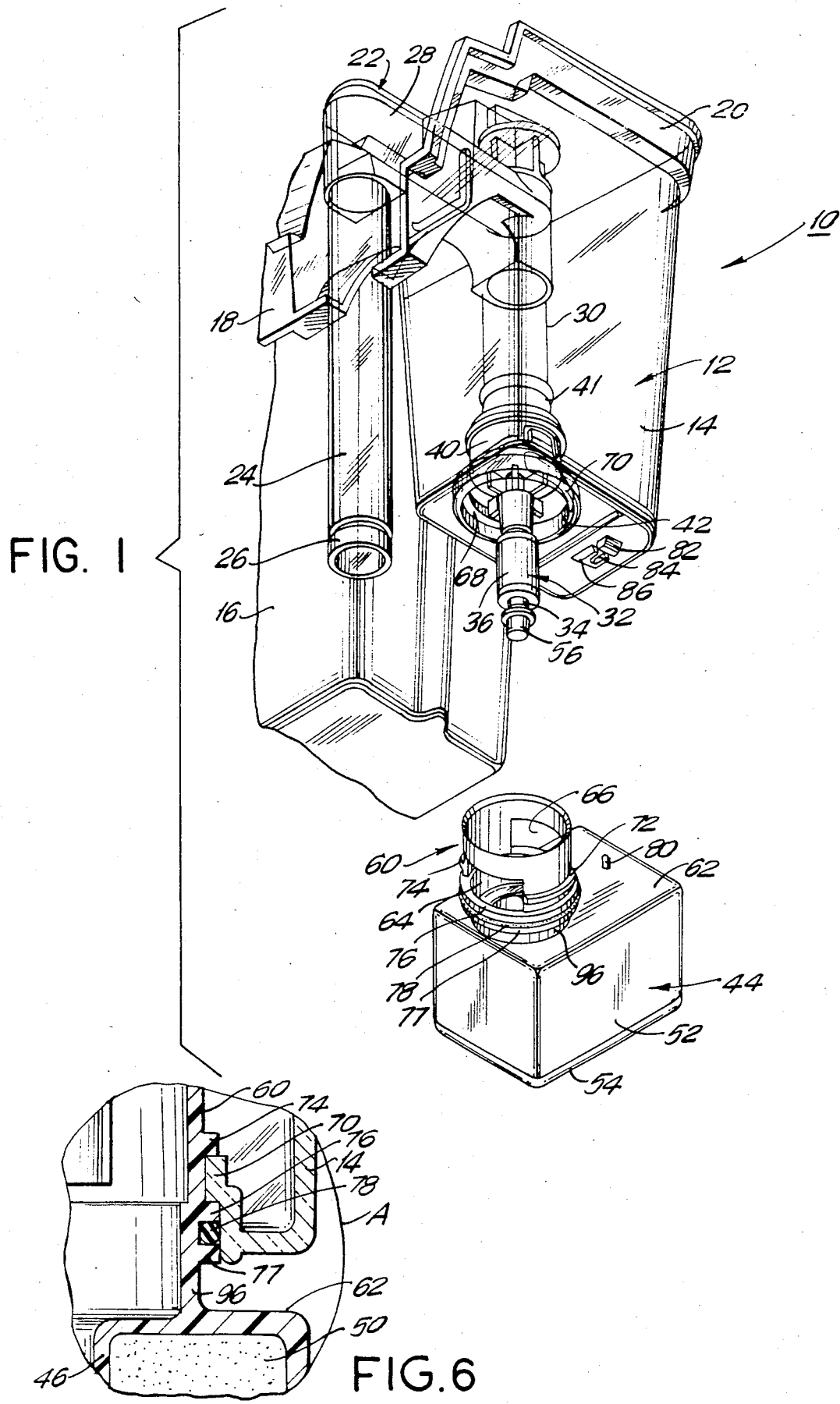
FIG. 1 is a partially broken away, perspective view of the aquarium filter assembly showing the power unit of the present invention prior to its assembly to the filter box.

Referring now to the drawings, there is shown an aquarium filter assembly 10 including a filter box 12 generally formed of plastic material.

The filter box includes an inlet chamber 14 for receiving contaminated water from an aquarium tank, and a filter chamber 16 in which the contaminated water is filtered. Appropriate filtration material would be placed within the filter chamber 16 for filtering the contaminated aquarium water. The filtered water passes back into the aquarium tank along a spillway 18. A cover 19 is placed on top of the upper edge 20 of the filter box. The aquarium filter assembly would be mounted on a wall of an aquarium tank and serves as an external aquarium filter.

Positioned with respect to the filter box is a removable unitary assembly 22 which includes an intake tube 24 having an inlet end 26 which would be positioned directly, or through extensions, into the aquarium tank. The unitary assembly is U-shaped and includes an upper transverse section 28 which sits on and is supported by the filter box 12. The opposing downwardly directed leg 30 serves as the outlet tube for discharging the contaminated water into the inlet chamber 14.

Depending from the distal end of the outlet tube 30 is a magnetic impeller assembly shown generally at 32. The impeller assembly includes a shaft 34 on which is rotably positioned a magnet 36 and an impeller 38. At the upper end of the impeller assembly is a connector cup 40 with a coupling stem 41 which receives the distal end of the outlet tube 30.

The magnet impeller assembly 32 depends from the filter box through a circular aperture 42. A power unit shown generally at 44 contains electromagnetic stator elements 45 and is removably connected through the aperture 42 to the filter box. The depending portion of the magnetic impeller unit is received in a well 46 in the power unit and is magnetically coupled to the stator 45 to be rotatably driven by the stator to thereby drive the impeller.

In operation, the rotating impeller causes water to be drawn from the aquarium tank through the inlet tube 24 and into the filter box for filtration and subsequent discharge of the filtered water back to the aquarium tank.

Figure 4:
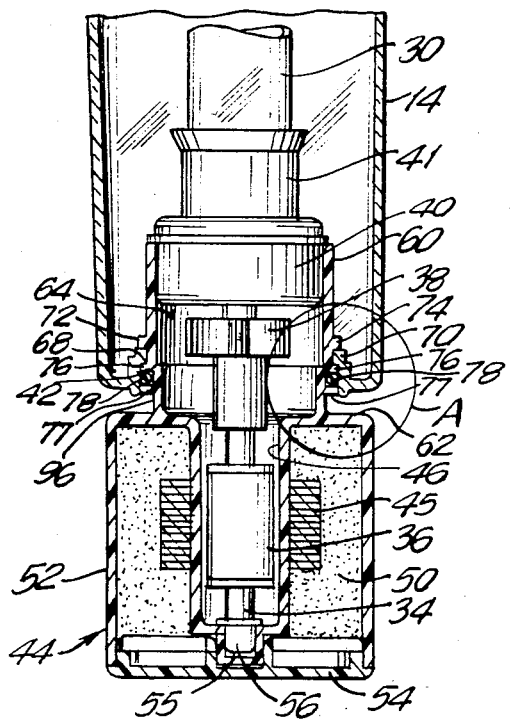
FIG. 4 is a sectional elevational view taken along lines 4—4 of FIG. 2.

As is best noted in FIG. 4, the power unit 44 includes stator laminations 45 with an energizing electromagnetic winding coil which would be connected to a power supply cord. The laminations 45 are typically U-shaped. The winding coil causes a flux path generated across the gap at the distal ends of the laminations. The well 46 is positioned between the distal ends of the laminations and receives the magnet 36 on the shaft 34 to cause the magnet to rotate which also rotates the impeller 38.

In order to protect the electromagnetic elements in the power unit 44, a potting material 50, typically epoxy, surrounds the electromagnetic elements. This serves to protect the electromagnetic elements from any water penetration into the power unit 44.

Encapsulating the potting material is the external shell 52. The periphery of the well 46 is integrally formed with the shell 52. At the lower end of the shell, a cover 54 seals the bottom of the housing. A seat 55 is formed at the lower end of well 46 to receive the knob 56 at the lower end of the shaft 34 to secure the shaft within the well.

In order to connect the power unit 44 to the filter box 14, there is provided a cylindrical stem 60 which projects upwardly from the upper surface 62 of the housing shell 52. The cylindrical stem 60 is hollow and serves as the mouth of the well 46 formed into the housing.

A pair of lateral openings 64,66 in either side of the cylindrical stem permits entry of the water drawn into the well to flow into the filter box.

The stem 60 is inserted into the aperture 42 and removably receives the cup 40 into its upper end to position the impeller 38 approximate the lateral openings 64,66 to permit the impeller to draw the water into the unitary assembly unit.

A bayonet type coupling arrangement is provided between the cylindrical stem 60 and the aperture 42. Specifically, a pair of opposing outwardly projecting arcuate ribs 68,70 are formed part way around the aperture 42 in diametric opposition to each other and each cover approximately a quarter radius. A pair of outwardly projecting arcuate ribs 72,74 are formed about the stem 60 of approximate arcuate length equaling the space between the arcuate ribs 68,70 on the aperture. Spaced below the projecting ribs 72,74 on the cylindrical stem are provided a pair of annular flanges 76,77 in between which is seated an O-ring 78 for sealing the connection between the stem 60 and the aperture 42. The space beneath the projecting ribs 72,74 on stem 60 and the upper annular flange 76 approximates the thickness of the projecting ribs 68,70 on the aperture 42.

Mounting of the power unit is achieved by inserting the power unit 44 into the aperture 42 at a 90 degree axially rotated relationship with its final position so that the ribs 72,74 projecting from the cylindrical stem 60 are received in the spaces between the ribs 68,70 on the aperture 42. After inserting the stem 60 so that the ribs 68,70 on the aperture abut the annular flange 76, the power unit is rotated clockwise to secure it in place. Removal of the power unit can be achieved by reversing the above steps.

Figure 3:
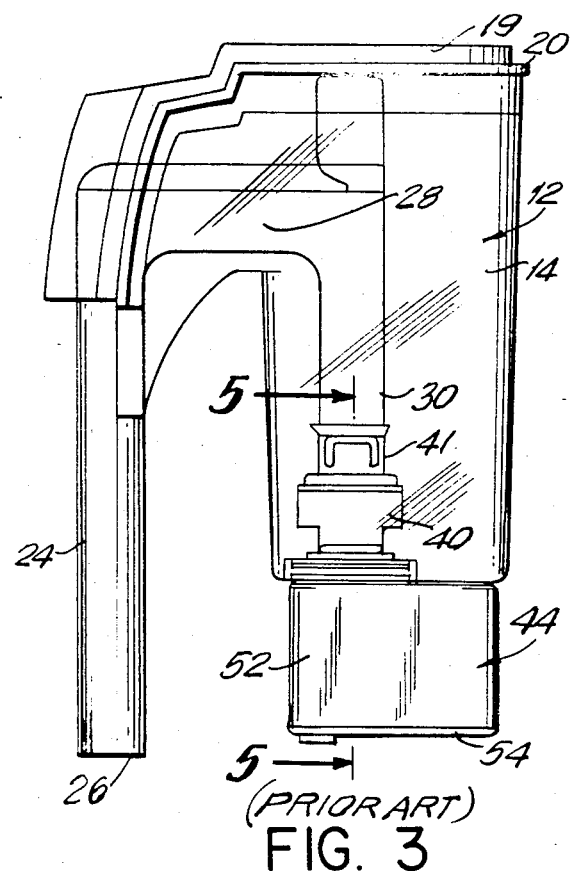
FIG. 3 is a view similar to that shown FIG. 2, and showing a power unit of the prior art connected to the filter box.
Figure 5:
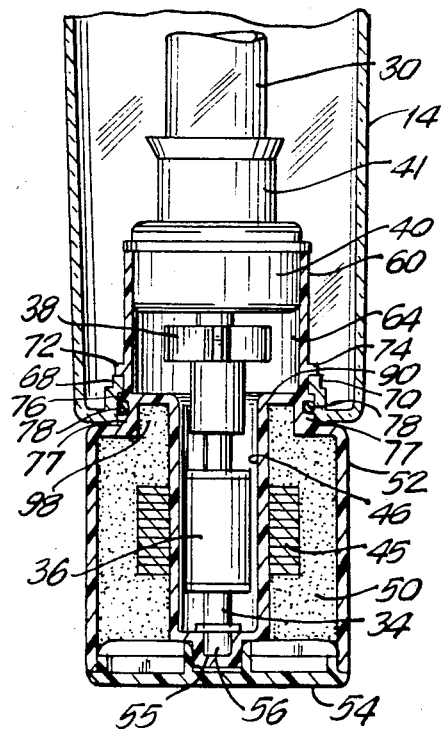
FIG. 5 is a sectional elevational view taken along lines 5—5 of FIG. 3.

Referring to FIGS. 3 and 5, it will be noted that in the prior art, the epoxy or other potting material 50 was positioned to fill the entire interior of the housing until the openings 64,66 on either side of the cylindrical stem 60. The purpose for this was to provide a uniform well 46 entirely through the power unit since the shape of the well continued in an uninterrupted fashion until its upper end 90, as shown in FIG. 5. This also provided easier manufacture since the lower flange 77 receiving the O-ring 78 had its surface 92 directly continuing from the housing shell 52. The top of the power unit also abutted directly the bottom of the filter box as shown in FIG. 3.

During normal operation as heretofore explained, the water drawn into the intake tube 22 would flow out through the openings 64,66 of the stem 60 and into the inlet chamber 14. Although the heat of the electromagnetic coil would tend to raise the temperature of the potting material, the circulation of aquarium water through the well served to sufficiently keep the temperature low enough to avoid any damage to the filter box.

Occasionally, through unusual clogging or power failures, the filter stops. When this occurs, the flow of water through the filter stops and runs dry. As a result, water in the inlet chamber 14 as well as the well 46 remains static. After a period of time, especially as a result of the heat generated by the power unit, the water in the well 46 and in the inlet chamber 14 will evaporate. In the absence of such cooling water, the temperature from the power unit will be sufficiently high to distort or damage the peripheral edge of the aperture 42 to which the power unit is connected.

After the filter is restarted, it has frequently been found that the filter box will now leak because of the distortion or damage caused to the aperture. The O-ring which normally is provided for sealing the aperture contact to the cylindrical stem will no longer be able to entirely close off all the areas and the distorted or damaged portion of the aperture will leak.

Figure 2:
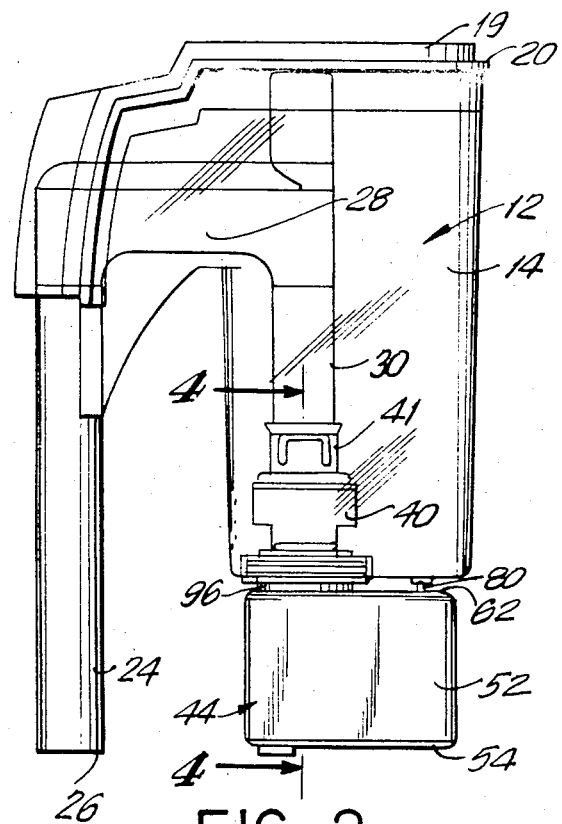
FIG. 2 is a side elevational view of the assembled aquarium filter with the power unit of the present invention connected to the filter box.

Referring now to FIGS. 2, 4, & 6, it can be noted that the power unit of the present invention provides a modification of the structure of the prior art power unit by limiting the potting material 50 so that it extends upwardly only until the upper surface 62 of the housing itself. Above this surface 62 only the thin walled cylindrical stem 60 projects without any interior potting material. Furthermore, the lower flange 77 is spaced from the upper wall 62 by means of a collar 96 which spaces the upper surface 62 from the flange.

In comparison of FIGS. 4 and 5, it is noted that in the prior art shown in FIG. 5, on the inside of the O-ring 78 there was provided a section of a potting material 98. This provided potting material directly on the interior portion adjacent the O-ring 78. When the potting material heated up, such heat passed to the O-ring which caused a distortion or damage to the peripheral edge of the aperture 42 of the filter box 12. Additionally, at the point of contact between the power unit and the aperture there was a considerable thickness of material which tended to retain the heat from the power unit.

As shown in FIGS. 4 & 6 in the present invention, on the interior of the O-ring 78 there is no potting material. The only portion on the interior of the O-ring is the cylindrical stem itself which is a thin walled material. Accordingly, there is a much thinner presence of material which cannot retain the heat and damage the aperture. Likewise, there is lacking any of the potting material which has a tendency of retaining the heat.

Also, it is noticed that the housing of the power unit is now spaced by collar 96 from the filter box. In order to retain the power unit secure without wobbling, an upwardly projecting pen 80 on the upper surface 62 of the power unit 44 slides along a rising cam surface 82 on the underside of the filter box and locks in place in a groove 84 provided in a receiving tab to lock the power unit in place.

Normally, the cylindrical stem is integrally formed with the housing shell of the power unit. The material utilized for the stem and the shell is a plastic material, and typically a thermo plastic material such as nylon. On the other hand, the potting material is typically a thermosetting material such as epoxy. The specific heat of nylon is considerably higher than that of epoxy. Accordingly, the epoxy will reach a higher temperature than the nylon and the presence of the epoxy on the interior of the prior art O-ring would have a tendency to raise the temperature at the O-ring higher than with the present structure. Additionally, the greater thickness of material at the position of the O-ring in the prior art had a tendency to increase the thermal capacity of heat at the point of the O-ring.

There has been disclosed heretofore the best embodiment of the invention presently contemplated. However, it is to be understood that various changes and modifications may be made thereto without departing from the spirit of the invention.

What is claimed is:

1. A motor stator unit for an aquarium filter, comprising a housing, a stator assembly in said housing, coupling means associated with said stator unit for removably coupling said stator unit to an aquarium filter box in magnetic flux relationship with a pump impeller unit supported on the filter box, said coupling means comprising a cylindrical stem projecting from said housing and defining a receiving member for the pump impeller unit, potting material in said housing for protecting said stator assembly, said potting material terminating below said stem for thermally isolating said housing from said filter box, whereby the stem has a reduced thickness at its point of coupling to said filter box, said filter box having an aperture for insertion of said cylindrical stem, means associated with said aperture for cooperatively engaging said coupling means to secure the stator unit in place, and an O-ring peripherally surrounding said stem at a location above the housing and above the potting material for fluidally sealing the stem in the aperture, the interior of the stem at the location of said O-ring being out of contact with the potting material.

2. A motor stator unit as in claim 1, wherein said coupling means and cooperating engaging means form a bayonet lock.

3. A motor stator unit as in claim 1, and comprising a well in said housing unit in fluid communication with said cylindrical stem for receiving a portion of said pump impeller unit.

4. An aquarium filter assembly comprising a filter box, an impeller unit support on said filter box, an encapsulated electromagnetic power unit for driving said impeller unit, said power unit comprising a housing, potting material within said housing for protecting said power unit a coupling stem projecting from the housing for connecting said power unit to said filter box, and an O-ring around said stem at a point above the housing and the potting material for fluidally sealing the stem connection, whereby the interior of the stem at the location of the O-ring is out of contact with the potting material for thermally isolating said housing from said filter box.

5. An aquarium filter assembly as in claim 4, wherein said power unit comprises thermal responsive materials, and said filter box comprises materials detrimentally affected by contact with excessive heat.

6. An aquarium filter assembly as in claim 5, wherein said stem, comprises a collar formed of a material less thermally responsive than said power unit material, and spacing said filter box from said thermally responsive material.

7. An aquarium filter assembly as in claim 6, wherein said power unit oomprises potting material surrounding electromagnetic elements within the power unit, and an outer encapsulating layer of plastic material, said stem being integral with said encapsulating layer.

8. An aquarium filter assembly as in claim 5, wherein said collar material has a higher specific heat than said potting material.

* * * * *